United States Patent
Matsuno et al.

(10) Patent No.: US 12,042,745 B2
(45) Date of Patent: Jul. 23, 2024

(54) TOY WITH IDENTIFICATION CODE

(71) Applicant: BANDAI CO., LTD., Tokyo (JP)

(72) Inventors: Shotaro Matsuno, Tokyo (JP); Satoshi Kitagawa, Tokyo (JP); Kazuki Ogiya, Tokyo (JP); Hirotaka Hatayama, Tokyo (JP); Yuta Abe, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 270 days.

(21) Appl. No.: 17/611,875

(22) PCT Filed: Jun. 4, 2020

(86) PCT No.: PCT/JP2020/022155
§ 371 (c)(1),
(2) Date: Nov. 16, 2021

(87) PCT Pub. No.: WO2020/250803
PCT Pub. Date: Dec. 17, 2020

(65) Prior Publication Data
US 2022/0212115 A1  Jul. 7, 2022

(30) Foreign Application Priority Data
Jun. 12, 2019  (JP) .................. 2019-109417

(51) Int. Cl.
*A63H 33/00* (2006.01)
*A63H 3/36* (2006.01)
(Continued)

(52) U.S. Cl.
CPC .............. *A63H 3/36* (2013.01); *A63H 33/00* (2013.01); *G06K 7/1413* (2013.01); *G06K 7/1417* (2013.01); *G06K 19/0614* (2013.01)

(58) Field of Classification Search
CPC ...... A63H 33/00; A63H 33/22; G06K 7/1417; G06K 7/1418; G06K 19/0614
See application file for complete search history.

(56) References Cited

U.S. PATENT DOCUMENTS 7,913,922 B1 *  3/2011  Roth ................... G06K 7/10722
                                                     235/494
8,894,461 B2 * 11/2014  Horovitz ................ A63H 33/00
                                                     446/175
(Continued)

FOREIGN PATENT DOCUMENTS

| JP | 04-354086 A | 12/1992 |
| JP | 3058491 U | 3/1999 |

(Continued)

OTHER PUBLICATIONS

PCT/JP2020/022155 International Search Report and Written Opinion mailed Sep. 1, 2020, English Translation.

*Primary Examiner* — John A Ricci
(74) *Attorney, Agent, or Firm* — Alston & Bird LLP

(57) ABSTRACT

A novel optically readable identification code and a toy with identification code with which a toy main body can be prevented from having the appearance compromised as much as possible are provided. A toy with identification code 10 includes a toy main body 11 with a surface provided with an identification code portion 12 including an optically readable identification code 13. The identification code 13 includes a plurality of dark color portions and a plurality of light color portions, and a chromatic color having an intensity lower than an intensity of a chromatic color used for the dark color portions is used for the light color portions.

9 Claims, 2 Drawing Sheets

(51) Int. Cl.
*G06K 7/14* (2006.01)
*G06K 19/06* (2006.01)

(56) References Cited

U.S. PATENT DOCUMENTS

| | | | | |
|---|---|---|---|---|
| 11,630,969 | B2 * | 4/2023 | Feldman | A61B 5/117 |
| | | | | 235/380 |
| 11,755,867 | B2 * | 9/2023 | Yoshida | H04L 9/0861 |
| | | | | 235/494 |
| 2015/0235118 | A1 * | 8/2015 | Simske | G06K 7/1417 |
| | | | | 235/494 |
| 2017/0127216 | A1 | 5/2017 | Coyne | |
| 2017/0339301 | A1 | 11/2017 | Pjanic et al. | |

FOREIGN PATENT DOCUMENTS

| | | |
|---|---|---|
| JP | 1999-161757 A | 6/1999 |
| JP | 2000-123130 A | 4/2000 |
| JP | 2002-514931 A | 5/2002 |
| JP | 2005-165565 A | 6/2005 |
| JP | 2007-018478 A | 1/2007 |
| JP | 2007-252791 A | 10/2007 |
| JP | 2007-334798 A | 12/2007 |
| JP | 2008-080610 A | 4/2008 |
| JP | 2008-194319 A | 8/2008 |
| JP | 2010-182348 A | 8/2010 |
| JP | 2012-170515 A | 9/2012 |
| JP | 2013-41343 A | 2/2013 |
| WO | WO 2015/083465 A1 | 6/2015 |
| WO | WO 2016/113842 A1 | 7/2016 |
| WO | WO 2020/250803 A1 | 12/2020 |

* cited by examiner

TOY WITH IDENTIFICATION CODE

CROSS REFERENCE TO RELATED APPLICATIONS

This application is a National Stage Application, filed under 35 U.S.C. § 371, of International Application No. PCT/JP2020/022155, filed on Jun. 4, 2020, which claims priority to Japanese Application No. 2019-109417, filed on Jun. 12, 2019; the contents of which are hereby incorporated by reference in their entirety.

BACKGROUND

Technical Field

The present invention relates to an optically readable identification code.

Description of Related Art

Japanese Patent Application Publication No. 2012-170515 discloses an identification-code-provided card having an identification code portion provided in a surface of a card main body. A QR code (registered trademark) is described as an example of an identification code in the identification code portion. Japanese Utility Model No. 3058491 discloses an identification-code-provided block having an identification code portion provided in a surface of a block main body. The specific mode of an identification code in the identification code portion is unknown.

Widely known optically readable identification codes include two-dimensional codes such as a QR code (registered trademark) and one-dimensional codes such as a barcode. These identification codes generally include a plurality of black portions and a plurality of white portions. When an identification code portion including such an identification code is provided in a surface of a toy main body, a colored surface in particular, the appearance of the toy main body might be compromised depending on the identification code.

SUMMARY

One object to be achieved by the present invention is to provide a novel optically readable identification code and a toy with identification code with which a toy main body can be prevented from having the appearance compromised as much as possible.

A toy with identification code according to one embodiment of the present invention comprises a toy main body provided with an identification code portion including an optically readable identification code, wherein the identification code includes a plurality of dark color portions and a plurality of light color portions, and a chromatic color with an intensity lower than an intensity of a chromatic color used for the dark color portions is used for the light color portions.

With the toy with identification code according to one embodiment of the present invention, the toy main body can be prevented from having the appearance compromised as much as possible.

DESCRIPTION OF EXEMPLARY EMBODIMENTS

First Embodiment

Figure 1:
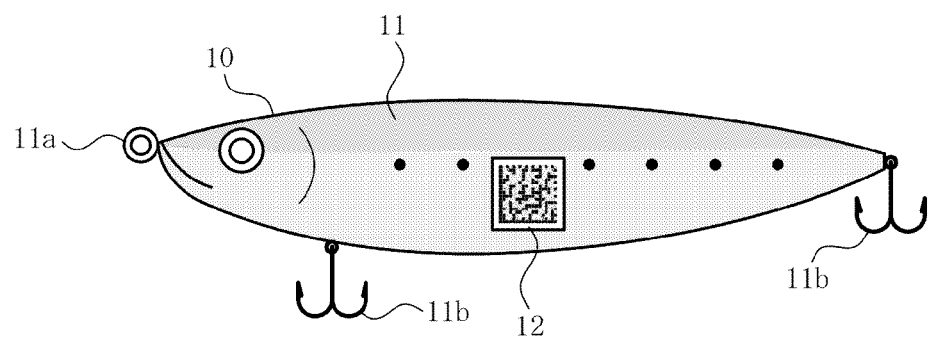
FIG. 1 is a diagram illustrating an example of a toy with identification code according to a first embodiment of the present invention.

A toy with identification code 10 illustrated as an example in FIG. 1 has an identification code portion 12 provided in a surface of a toy main body 11 having a fishing lure shape. The toy with identification code 10 is a game assisting item usable while fishing-related game software is being executed, and an identification code 13 (see FIG. 2) of the identification code portion 12 can be optically read by using a code reading device attached to a game device, as described later.

The toy main body 11 has an outer shape resembling a fish, and has a surface with a color (coloring) corresponding to the target fish (here, the dominant color (coloring) is green). The toy main body 11 includes an eyelet portion 11a and a hook portion 11b similar to those of an actual fishing lure. Note that sharp portions of the hook portion 11b and the like are rounded to prevent injury during use.

The position of the identification code portion 12 in the surface of the toy main body 11 is not particularly limited, as long as the identification code 13 can be optically read. The toy main body 11 may alternatively have an outer shape resembling a fish other than that illustrated, crustaceans such as shrimp, cephalopods such as squid, or the like. The positions, the numbers, and the shapes of the eyelet portions 11a and the hook portions 11b of the toy main body 11 are not particularly limited, and other parts such as a lip portion or a decorative portion (guide portion) may be additionally provided.

The identification code portion 12 is provided in the surface of the toy main body 11 by methods such as attaching a print sticker or direct printing. The identification code portion 12 includes the identification code 13 holding identification information on the toy with identification code 10.

Figure 2:
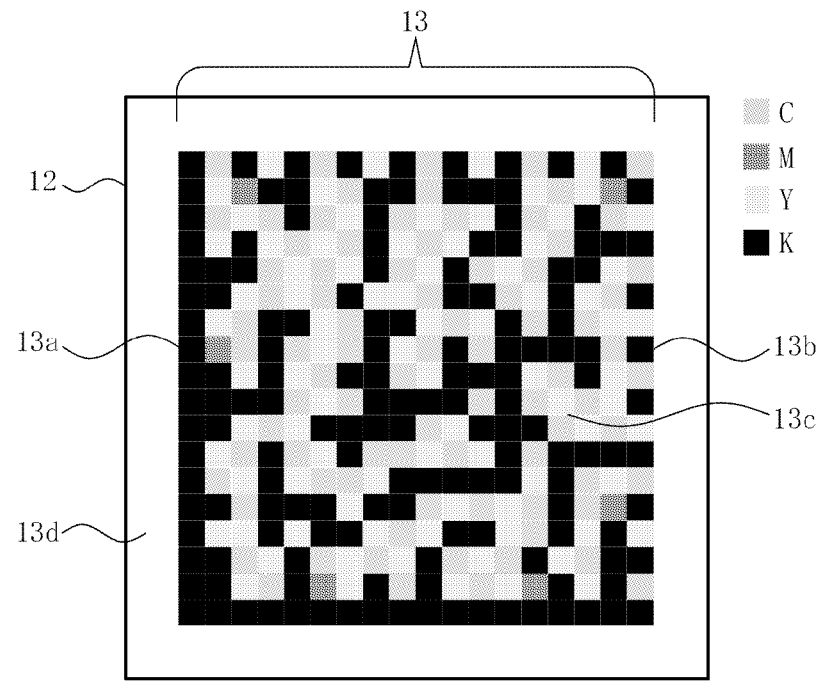
FIG. 2 is an enlarged view of an identification code portion illustrated in FIG. 1.

The identification code 13 of the identification code portion 12 illustrated as an example in FIG. 2 includes a plurality of dark color portions (reference numeral omitted) and a plurality of light color portions (reference numeral omitted). A chromatic color with an intensity lower than that of a chromatic color used for the dark color portions is used for the light color portions. One or more chromatic colors are used for the light color portions, and each light color portion is colored with a single chromatic color.

A detailed description is given on modes of the identification code portion 12 and the identification code 13 with reference to FIG. 2. The identification code 13 is a data matrix of a square type, which is one type of a two-dimensional code, and includes a data area 13c surrounded by an L-shaped alignment pattern 13a and an inverted L-shaped clock pattern 13b. A quiet zone 13d is provided at the circumference of the identification code 13. The total number of cells in the identification code 13 is 324 (18 cells×18 cells), and the total number of cells in the data area 13c is 256 (16 cells×16 cells).

For example, when the size of a single cell is 0.5 mm×0.5 mm, the actual size of the identification code 13 is 9 mm×9 mm. In this case, when the quiet zone 13d is 1 mm (corresponding to two cells), the actual size of the identification code portion 12 is 11 mm×11 mm. When the quiet zone 13d is 0.5 mm (corresponding to one cell), the actual size of the identification code portion 12 is 10 mm×10 mm. For example, when the size of a single cell is 0.25 mm×0.25 mm, the actual size of the identification code 13 is 4.5 mm×4.5 mm. In this case, when the quiet zone 13d is 0.5 mm (corresponding to two cells), the actual size of the identification code portion 12 is 5.5 mm×5.5 mm. When the quiet zone 13d is 0.25 mm (corresponding to one cell), the actual size of the identification code portion 12 is 5 mm×5 mm.

The total number of cells in the identification code 13 is not limited to 324. The total number of cells may be smaller than 324, with the identification code 13 including 16 cells×16 cells, 14 cells×14 cells, 12 cells×12 cells, or 10 cells×10 cells. Conversely, the total number of cells may be more than 324, with the identification code 13 including 20 cells×20 cells, 22 cells×22 cells, 24 cells×24 cells, 26 cells×26 cells, 32 cells×32 cells, or 36 cells×36 cells.

Still, when reading resolution of the code reading device described later used for optically reading the identification code 13 of the identification code portion 12 is not so high, the size of a single cell smaller than 0.25 mm×0.25 mm might result in a reading error. Thus, this point needs to be taken into consideration. When the size of the identification code portion 12 is larger than 11 mm×11 mm, the ratio of area in the surface of the toy main body 11 occupied by the identification code portion 12 can be large depending on the size of the toy main body 11, and thus the appearance of the toy main body 11 might be compromised due to a factor other than color. Thus, this point also needs to be taken into consideration.

A detailed description will be given on colors of the dark color portions (dark color cells) and the light color portions (light color cells) of the identification code 13 with reference to FIG. 2. For the identification code 13, a CMYK color model is used for the sake of the printing thereof. Of the total number of cells 324, 154 dark color cells have a color black (K), and 170 light color cells each have a color cyan (C), magenta (M), or yellow (Y).

According to Japan Color 2011 conforming to ISO, the respective target densities of black (K), cyan (C), magenta (M), and yellow (Y) can be, for example, 1.70, 1.55, 1.50 to 1.55, and 1.32 to 1.38. The respective CIELAB values (L*,a*,b*) in a L*a*b* color system of black (K), cyan (C), magenta (M), and yellow (Y) can be, for example, (16,1,2), (53,−36,−52), (46,76,−3), and (89,−6,94).

Of the 154 dark color cells, dark color cells excluding the alignment pattern 13a and the clock pattern 13b, that is, the dark color cells in the data area 13c are randomly depicted for the sake of illustration, and do not indicate specific information.

Considering the above-described fact that the dominant color with which the surface of the toy main body 11 is colored is green, of the 170 light color cells, 82 light color cells have the color cyan (C), 82 light color cells have the color yellow (Y), and the remaining 6 light color cells have the color magenta (M). The magenta (M) light color cells are arranged on the outer circumference of the data area 13c so as to be less noticeable, and the cyan (C) light color cells and the yellow (Y) light color cells are dispersed as much as possible so that each type of such cells are not densely arranged in a single location, and are adjacently arranged.

The ratio among the numbers of the cyan (C), the magenta (M), and the yellow (Y) cells (color area ratio) is set as described above, and the cells are arranged as described above, so that the mixed color of CMY (cyan, magenta, yellow) in the 170 light color cells corresponds to the dominant color (green) with which the surface of the toy main body 11 is colored. In other words, the 170 light color cells of the identification code 13 can be seen to be in a green color that is the same as or similar to the dominant color with which the surface of the toy main body 11 is colored. This is evident when the toy with identification code 10 is viewed from a certain distance.

The code reading device usable for optically reading the identification code 13 of the identification code portion 12 of the identification code provided toy 10 illustrated as an example in FIG. 1 not only includes one having a function of binarizing an image captured by an infrared-based code reader or digital camera and capturing identification information (binary data) from the binary image, but also includes one having a function of binarizing an image captured by a non-infrared-based code reader or digital camera using a filter or digital processing for removing the light color portions (light color cells) and capturing identification information (binary data) from the binary image. Thus, the optically readable identification code of one embodiment of the present invention cannot be read and thus correct data cannot be obtained therefrom using a normal optical camera alone, meaning that a risk of information leakage can be reduced.

As described above, the chromatic color with an intensity lower than that of the chromatic color used for the dark color portions (dark color cells) is used for the light color portions (light color cells) of the identification code 13 of the identification code portion 12, whereby the improvement in the appearance (designability) of the toy main body 11 can be facilitated, with the appearance prevented from being compromised as much as possible, as in a case where an identification code portion including an identification code with the dark color portions being black and the light color portions being white is provided on the surface of the toy main body 11, a colored surface in particular.

The CMYK color model is used for the colors of the dark color portions (dark color cells) and the light color portions (light color cells) of the identification code 13, whereby the identification code 13 can be easily produced, even when the identification code portion 12 including the identification code 13 is provided in the surface of the toy main body 11 through a procedure such as attaching a print sticker or direct printing. The identification code of one embodiment of the present invention is difficult to reproduce through scanning and copying using normal printers or copiers, because such an approach results in an unclear boundary between the dark color portions (dark color cells) and the light color portions (light color cells), meaning that the fraudulent copying of the identification code can be prevented.

With the ratio among the numbers of CMY (cyan, magenta, yellow) cells used for the light color cells of the identification code 13 (color area ratio) adjusted, the CMY (cyan, magenta, yellow) mixed color of the light color cells corresponds to the dominant color (green) with which the surface of the toy main body 11 is colored. This can also contribute to the improvement of the appearance of the toy main body 11. It is a matter of course that when the dominant color with which the surface of the toy main body 11 is colored is green, only CY (cyan, yellow) may be used for the light color cells of the identification code 13 to achieve a similar effect.

When the toy main body 11 has an outer appearance resembling a fish, the plurality of dark color portions (dark color cells) and light color portions (light color cells) forming the identification code 13, the light color portions (light color cells) using chromatic colors in particular can appear as fish scales. This can also contribute to the improvement of the appearance of the toy main body 11.

When the dominant color with which the surface of the toy main body 11 is colored is blue, the ratio among the numbers of CMY (cyan, magenta, yellow) cells used for the light color cells (color area ratio) may be adjusted to obtain blue, or only CM (cyan, magenta) may be used for the light color cells. When the dominant color with which the surface of the toy main body 11 is colored is red, the ratio among the numbers of CMY (cyan, magenta, yellow) cells used for the light color cells (color area ratio) may be adjusted to obtain red, or only MY (magenta, yellow) may be used for the light color cells.

FIG. 2 illustrates the quiet zone 13d not colored with CMY (cyan, magenta, yellow) as an example. Alternatively, the quiet zone 13d may be colored similarly to the light color cells. Specifically, when the dominant color with which the surface of the toy main body 11 is colored is green, blue, or red, the quiet zone 13d may be colored based on the similar color area ratio or selected colors to those described above.

Second Embodiment

Figure 3:
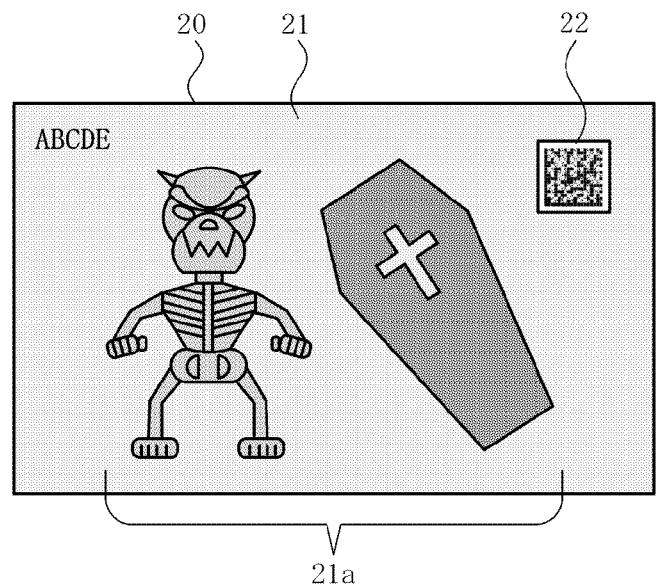
FIG. 3 is a diagram illustrating an example of a toy with identification code according to a second embodiment of the present invention.

A toy with identification code 20 illustrated as an example in FIG. 3 has an identification code portion 22 provided in the surface of a toy main body 21 having a card shape. The toy with identification code 20 is a game assisting item usable while card-related game software is being executed, and an identification code 23 (see FIG. 4) of the identification code portion 22 can be optically read by using a code reading device attached to a game device, as described later.

The toy main body 21 has a surface provided with a title (see ABCDE at an upper left part in FIG. 3, reference numeral omitted), and a unique picture portion 21a corresponding to the title or the like, specifically, the picture portion 21a (such as drawing, photograph, or illustration) including a skeleton and a casket. The surface has a color (the dominant color for this coloring is red) corresponding to the title and the picture portion 21a.

The position of the identification code portion 22 in the surface of the toy main body 21 is not particularly limited, as long as the identification code 23 can be optically read. The picture portion 21a provided in the surface of the toy main body 21 may be a drawing, a photograph, an illustration, or the like of a non-living object such as a character, a living object such as an animal, or the like different from that illustrated as an example. Furthermore, the title can also be changed as appropriate.

The identification code portion 22 is provided in the surface of the toy main body 21 by a procedure such as attaching a print sticker or direct printing. The identification code portion 22 includes the identification code 23 holding identification information on the toy with identification code 20.

Figure 4:
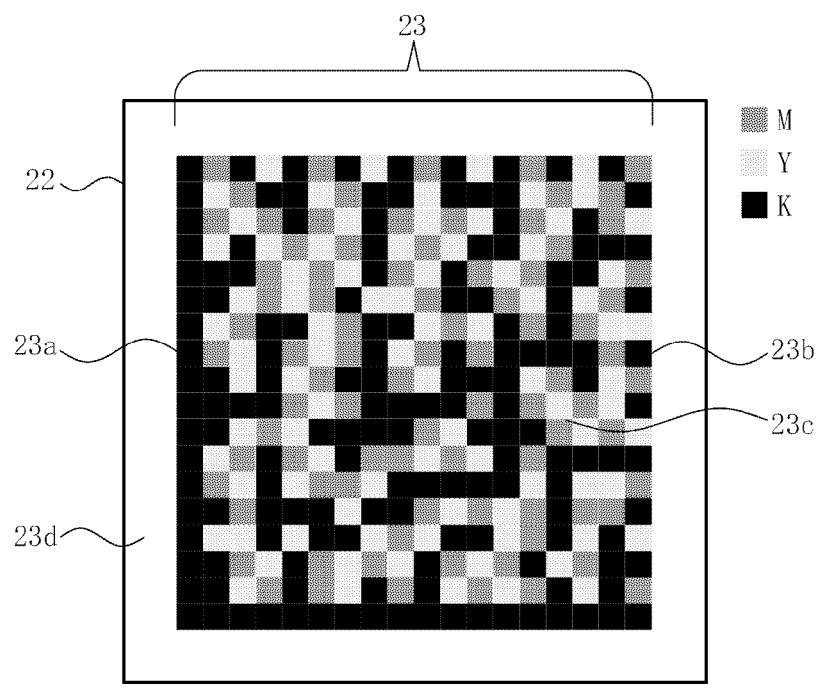
FIG. 4 is an enlarged view of an identification code portion illustrated in FIG. 3.

As in the first embodiment, the identification code 23 of the identification code portion 22 illustrated as an example in FIG. 4 includes a plurality of dark color portions (reference numeral omitted) and a plurality of light color portions (reference numeral omitted). A chromatic color with an intensity lower that of a chromatic color used for the dark color portions is used for the light color portions. One or more chromatic colors are used for the light color portions, and each light color portion is colored with a single chromatic color.

A detailed description is given on modes of the identification code portion 22 and the identification code 23 with reference to FIG. 4. The identification code 23 is a data matrix of a square type, which is one type of a two-dimensional code, and includes a data area 23c surrounded by an L-shaped alignment pattern 23a and an inverted L-shaped clock pattern 23b. A quiet zone 23d is provided at the circumference of the identification code 23. The total number of cells in the identification code 23 is 324 (18 cells×18 cells), and the total number of cells in the data area 23c is 256 (16 cells×16 cells).

The size of a single cell, the actual size of the identification code 23, the actual size of the identification code portion 22, the total number of cells, and the matters to be taken into consideration are the same as those described above in the first embodiment, and thus will not be described herein.

A detailed description will be given on colors of the dark color portions (dark color cells) and the light color portions (light color cells) of the identification code 23 with reference to FIG. 4. For the identification code 23, a CMYK color model is used for the sake of the printing thereof. Of the total number of cells 324, 154 dark color cells have a color black (K), and 170 light color cells each have a color magenta (M) or yellow (Y).

The target densities of black (K), magenta (M), and yellow (Y), and the CIELAB values (L*,a*,b*) of the L*a*b* color system are the same as those described above in the first embodiment, and thus will not be described herein. Of the 154 dark color cells, dark color cells excluding the alignment pattern 23a and the clock pattern 23b, that is, the dark color cells in the data area 23c are randomly depicted for the sake of illustration, and do not indicate specific information.

Considering the above-described fact that the dominant color with which the surface of the toy main body 21 is colored is red as described above, of the 170 light color cells, 85 light color cells have the color magenta (M) and 85 light color cells have the color yellow (Y). The magenta (M) light color cells and the yellow (Y) light color cells are dispersed as much as possible so that each type of such cells are not densely arranged in a single location, and are adjacently arranged.

The ratio among the numbers of the magenta (M) and the yellow (Y) cells (color area ratio) is set as described above, and the cells are arranged as described above, so that the mixed color of MY (magenta, yellow) in the 170 light color cells corresponds to the dominant color (red) with which the surface of the toy main body 11 is colored. In other words, the 170 light color cells of the identification code 23 can be seen to be in a red color that is the same as or similar to the dominant color with which the surface of the toy main body 21 is colored. This is evident when the toy with identification code 20 is viewed from a certain distance.

The code reading device usable for optically reading the identification code 23 of the identification code portion 22 of the identification code provided toy 20 illustrated as an example in FIG. 3 not only includes one having a function of binarizing an image captured by an infrared-based code reader or digital camera and capturing identification information (binary data) from the binary image, but also includes one having a function of binarizing an image captured by a non-infrared-based code reader or digital camera using a filter or digital processing for removing the light color portions (light color cells) and capturing identification information (binary data) from the binary image.

As described above, the chromatic color with an intensity lower than that of the chromatic color used for the dark color portions (dark color cells) is used for the light color portions (light color cells) of the identification code 23 of the identification code portion 22, whereby the improvement in the appearance of the toy main body 21 can be facilitated, with the appearance prevented from being compromised as much as possible, as in a case where an identification code portion including an identification code with the dark color portions being black and the light color portions being white is provided on the surface of the toy main body 21, a colored surface in particular.

The CMYK color model is used for the colors of the dark color portions (dark color cells) and the light color portions (light color cells) of the identification code 23, whereby the identification code 23 can be easily produced, even when the identification code portion 22 including the identification code 23 is provided in the surface of the toy main body 11 through a procedure such as attaching a print sticker or direct printing.

With the ratio among the numbers of MY (magenta, yellow) cells used for the light color cells of the identification code 23 (color area ratio) adjusted, the MY (magenta, yellow) mixed color of the light color cells corresponds to the dominant color (red) with which the surface of the toy main body 21 is colored. This can also contribute to the improvement of the appearance of the toy main body 21. It is a matter of course that when the dominant color with which the surface of the toy main body 21 is colored is red, CMY (cyan, magenta, yellow) may be used for the light color cells of the identification code 23 and the ratio among the numbers of cells (color area ratio) may be adjusted to achieve a similar effect.

When the dominant color with which the surface of the toy main body 21 is colored is blue, only CM (cyan, magenta) may be used for the light color cells, or CMY (cyan, magenta, yellow) may be used for the light color cells and the ratio among the numbers of cells (color area ratio) may be adjusted to obtain blue. When the dominant color with which the surface of the toy main body 21 is colored is green, only CY (cyan, yellow) may be used for the light color cells, or CMY (cyan, magenta, yellow) may be used for the light color cells and the ratio among the numbers of cells (color area ratio) may be adjusted to obtain green.

FIG. 4 illustrates the quiet zone 23d not colored with CMY (cyan, magenta, yellow) as an example. Alternatively, the quiet zone 23d may be colored similarly to the light color cells. Specifically, when the dominant color with which the surface of the toy main body 21 is colored is red, blue, or green, the quiet zone 13d may be colored based on the similar color area ratio or selected colors to those described above.

Other Embodiments (1) FIG. 2 illustrates an example for the first embodiment described above, where the number of chromatic colors used for the light color portions of the identification code 13 is three, that is, CMY (cyan, magenta, yellow). FIG. 4 illustrates an example for the second embodiment described above, where the number of chromatic colors used for the light color portions of the identification code 23 is two, that is, MY (magenta, yellow). However, when the dominant color with which the surface of the toy main bodies 11 and 21 is colored is cyan, the color of all of the light color portions of the identification codes 13 and 23 may be cyan (C). When the dominant color with which the surface of the toy main bodies 11 and 21 is colored is magenta, the color of all of the light color portions of the identification codes 13 and 23 may be magenta (M). When the dominant color with which the surface of the toy main bodies 11 and 21 is colored is yellow, the color of all of the light color portions of the identification codes 13 and 23 may be yellow (Y).

(2) According to the embodiments described above and (1) described above, an example is provided where the number of chromatic colors used for the light color portions of the identification codes 13 and 23 is one or more selected from CMY (cyan, magenta, yellow). However, a chromatic color other than CMY (cyan, magenta, yellow) may be used. Still, considering the fact that the identification code portions 12 and 23 including the identification codes 13 and 23 are provided on the surfaces of the toy main bodies 11 and 21 through a procedure such as attaching a print sticker or direct printing, the number of chromatic colors used for the light color portions of the identification codes 13 and 23 is conveniently one or more selected from CMY (cyan, magenta, yellow) for the sake of printing.

(3) In the embodiments described above, an example is described where the color of the dark color portions of the identification codes 13 and 23 is black (K). The identification codes 13 and 23 can be optically read as long as the intensity of the dark color portions is higher than the intensity of the light color portions. Thus, a color other than black (K) may be used as the color of the dark color portions of the identification codes 13 and 23 if this condition is satisfied.

(4) In the embodiments described above, an example is described where the data matrix of a square type is used as the identification codes 13 and 23. However, a data matrix of a laterally elongated rectangle type (with the number of cells in the vertical direction being ½ of the number of cells in the horizontal direction) may be used as appropriate for the identification codes.

(5) In the embodiments described above, an example is described where the data matrix is used as the identification codes 13 and 23. However, other known two-dimensional codes may be used as appropriate for the identification codes. Examples of such codes include a matrix type code such as a QR code (registered trademark) and VeriCode, and a stack type code such as PDF 417 and CODE 49.

(6) In the embodiments described above, an example is described where a two-dimensional code (data matrix) is used as the identification codes 13 and 23. However, a one-dimensional code, known examples of which include JAN, ITF, NW-7, CODE 39, CODE 128, or the like, may be used as appropriate instead of the two-dimensional code. In a case of the one-dimensional code, a dark color bar (black bar) corresponds to the dark color portions, and a light color space (white space) corresponds to the light color portions.

(7) FIG. 1 illustrates as an example for the first embodiment described above, where the toy with identification code 10 having the toy main body 11 of a fishing lure shape. FIG. 3 illustrates as an example for the second embodiment described above, the toy with identification code 20 having the toy main body 21 of a card shape. The toy main body may be something other than these, such as one resembling a weapon, one resembling a vehicle, an action figure, a plush toy, or the like. The toy main body is not necessarily a game assisting item usable while the game software is being executed.

The optically readable identification codes of embodiments of the present invention are applicable to various items other than toys, such as a packaging container for food or the like, electric appliances, books, or tickets. With the identification codes having colors (coloring) suitable for the outer appearance of the items, identification-code-provided items with a higher designability can be provided.

REFERENCE SIGNS LIST

10 . . . toy with identification code, 11 . . . toy main body, 12 . . . identification code portion, 13 . . . identification code, 20 . . . toy with identification code, 21 . . . toy main body, 22 . . . identification code portion, 23 . . . identification code.

What is claimed is:

1. A toy comprising:
a toy main body comprising an identification code portion comprising an optically readable identification code,
wherein the optically readable identification code comprises a plurality of first portions and a plurality of second portions,
the plurality of first portions comprise a first chromatic color comprising a first intensity, the first chromatic color comprising black of the CMYK color model,
the plurality of second portions comprise a second chromatic color comprising a second intensity, the second chromatic color comprising one or more of cyan, magenta, and yellow of the CMYK color model, and
the optically readable identification code comprises a one-dimensional code or a two-dimensional code.

2. The toy according to claim 1, wherein the toy main body comprises a chromatic color.

3. The toy according to claim 1, wherein the second chromatic color comprises two or more chromatic colors, each of the plurality of chromatic colors comprising a single chromatic color.

4. The toy according to claim 3, wherein the toy main body comprises a dominant color comprising a mixed color of the two or more selected chromatic colors.

5. The toy according to claim 3, wherein the toy main body comprises a dominant color, and
at least one of the plurality of chromatic colors corresponds to the dominant color.

6. The toy according to claim 1, wherein the optically readable identification code comprises the two-dimensional code, but not the one-dimensional code.

7. The toy according to claim 6, wherein the two-dimensional code comprises a data matrix.

8. The toy according to claim 1, wherein the optically readable identification code comprises the one-dimensional code, but not the two-dimensional code.

9. The toy according to claim 1, wherein the optically readable identification code of the identification code portion is configured to be optically read by a code reading device, wherein the toy comprising the optically readable identification code is a game-assisting item configured to be used during the execution of a game software.

* * * * *